United States Patent [19]
Takanami et al.

[11] Patent Number: 5,998,318
[45] Date of Patent: Dec. 7, 1999

[54] SINTERED SILICON CARBIDE WITH GRAPHITE ADDED THERETO, SINTERED COMPOSITE CONTAINING THE SAME, AND MECHANICAL SEAL

[75] Inventors: Hiroshi Takanami; Yukio Ishii, both of Tokyo; Mamoru Asuwa, Nagano, all of Japan

[73] Assignees: Tanken Seal Seiko Co., Ltd.; Syowa Denko K.K., both of Tokyo, Japan

[21] Appl. No.: 09/037,432

[22] Filed: Mar. 10, 1998

[30] Foreign Application Priority Data

Mar. 11, 1997 [JP] Japan ..................................... 9-074614

[51] Int. Cl.⁶ .................................................. C04B 35/569
[52] U.S. Cl. ................................. 501/90; 501/89; 501/91; 501/99; 501/100
[58] Field of Search .................................. 501/89, 90, 91, 501/99, 100

[56] References Cited

U.S. PATENT DOCUMENTS

| | | | |
|---|---|---|---|
| 4,525,461 | 6/1985 | Boecker et al. | 501/90 |
| 4,692,418 | 9/1987 | Boecker et al. | 501/90 |
| 5,135,893 | 8/1992 | Dohi et al. | 501/90 |
| 5,837,631 | 11/1998 | Elstner et al. | 501/90 |

FOREIGN PATENT DOCUMENTS

| | | |
|---|---|---|
| 864549A2 | 9/1998 | European Pat. Off. . |
| 407291710A | 11/1995 | Japan . |
| 407291712A | 11/1995 | Japan . |
| 410251063A | 9/1998 | Japan . |

*Primary Examiner*—Karl Group
*Attorney, Agent, or Firm*—Nields, Lemack & Dingman

[57] ABSTRACT

There is provided a sintered silicon carbide with graphite added thereto having excellent lubrication characteristics. The sintered silicon carbide with graphite added thereto contains 10–30 wt. % of natural graphite flakes having an average grain size of 8–100 μm and the remainder silicon carbide and a sintering aid, and having a relative density of 80–92%.

19 Claims, 3 Drawing Sheets

SINTERED SILICON CARBIDE WITH GRAPHITE ADDED THERETO, SINTERED COMPOSITE CONTAINING THE SAME, AND MECHANICAL SEAL

BACKGROUND OF THE INVENTION AND RELATED ART STATEMENT

The present invention relates to sintered silicon carbide with graphite added thereto and to a sintered composite containing the same used for mechanical seals and the like. More particularly, the present invention relates to sintered silicon carbide with graphite added thereto and to a sintered composite containing the same which are endowed with excellent lubrication properties, and which provide excellent rubbing materials for such mechanical seals that are used under dry conditions, that are used under conditions in which the sliding surfaces become temporarily dry during operation, or that are used in combination with seal fluid having no lubrication ability, and which provide excellent material for bearings which produce temporary dry conditions.

Conventionally, cemented carbide, sintered alumina, sintered silicon carbide, and the like have been used as rubbing materials for mechanical seals. Among these materials, sintered silicon carbide has been most widely used, as it is endowed with good thermal conductivity, low coefficient of thermal expansion, high hardness, excellent wear resistance, excellent corrosion resistance, and excellent oxidation resistance. However, under dry conditions of gas or steam, sintered silicon carbide used as a rubbing material for stationary and rotating rings may cause seizure, scoring, generation of thermal cracks or abnormal wear, as sintered silicon carbide has poor lubrication ability. In addition, the same problems may be caused in temporary dry conditions, as experienced when hot water is used. Moreover, in fluids having poor lubrication ability such as water, rubbing materials may adhere to each other. This phenomenon, which is known as linking, may lead to damage to the mechanical seal itself.

Furthermore, sintered silicon carbide is a material difficult to work due to its high hardness, and causes problems such as generation of defectives during processing and high cost of processing.

In order to solve the above-mentioned problems characteristic to sintered silicon carbides, there have been suggested materials having improved friction and wear properties. For example, Japanese Patent Application Laid-Open (kokai) No. 61-132575 (the disclosure of which is herein incorporated by reference) discloses a silicon carbide composite which uses a sintered silicon carbide, which is suitable for producing a composite together with synthetic resins such as fluororesins. However, as described in examples of the publication, this silicon carbide composite has extremely poor bending strength compared with that of sintered silicon carbide prepared by way of sintering under atmospheric pressure, and has poor heat and corrosion resistance as it is a composite containing resin, making it unsuitable as a rubbing material for a mechanical seal used to seal corrosive or high temperature fluid.

Japanese Patent Application Laid-Open (kokai) No. 60-141676 (the disclosure of which is herein incorporated by reference) discloses a silicon carbide/graphite/carbon composite ceramic material formed of approximately 1–48 wt. % of graphite carbon having an average grain size of not more than 8 $\mu$m, about 0.5–5.0 wt. % of amorphous carbon, and the remainder silicon carbide. Japanese Patent Application Laid-Open (kokai) No. 63-260861 (the disclosure of which is herein incorporated by reference) discloses a silicon carbide/graphite ceramic composite having self-lubrication ability; i.e., a silicon carbide composite with graphite added thereto consisting of granules of graphite grains having primary grains of 5–8 $\mu$m, as well as a process of producing the same. However, none of these materials have sufficient lubrication ability or bending strength.

The object of the present invention is to provide sintered silicon carbide with graphite added thereto (hereinafter referred to as "graphite-added sintered silicon carbide) and a sintered composite containing the same which can solve the above-mentioned problems characteristic to conventional silicon carbide composites, and which exhibit excellent rubbing characteristics, particularly under dry conditions and under non-lubricant conditions, as well as mechanical seals prepared therefrom.

SUMMARY OF THE INVENTION

The inventors of the present invention have carried out extensive studies and have found that rubbing characteristics are improved, particularly under dry conditions, when natural graphite which is highly crystallized and is of large grain size is added to the composite. Strict determination of the amount, shape, and density of natural graphite to be added has led to the invention of a material which exhibits excellent properties, particularly for use in mechanical seals. In addition, because graphite-added sintered silicon carbide prepared in accordance with the proper formulation may permit leakage therethrough, carbonized or graphitized resin is incorporated as a sealing agent so as to develop a sintered composite containing graphite-added sintered silicon carbide which is suitable for mechanical seals used under dry conditions.

The present invention is characterized by comprising 10–30 wt. % of natural graphite flakes having an average grain size of 8–100 $\mu$m and the remainder silicon carbide and a sintering aid, and by having a relative density of 80–92%.

Natural graphite has excellent self-lubrication properties, and greatly contributes to an improvement in dry characteristics when natural graphite grains which are highly crystallized and are of large grain size are used in the form of a homogeneous dispersion. However, the dry characteristics are largely affected by the range of the grain size and the amount of natural graphite to be added, the characteristics of silicon carbide, and the density of the obtained graphite-added sintered silicon carbide. To achieve the above-mentioned object, the inventors of the present invention have conducted extensive studies and found that excellent lubrication ability is imparted by the addition of 10–30 wt. % of natural graphite flakes which are highly crystallized and have an average grain size of 8–100 $\mu$m to $\alpha$-type silicon carbide having an average grain size of 2–7 $\mu$m and an average aspect ratio of 1–2 to thereby produce a graphite-added sintered silicon carbide having a relative density of 80–92%. The lubrication ability is further improved by the addition of a carbide or a graphite obtained by pyrolysis of thermosetting resin to the thus-obtained graphite-added sintered silicon carbide having a relative density of 80–92% and by the sealing of open pores, to thereby provide an excellent material for rubbing materials of mechanical seals.

The lubrication ability is still further improved when an average grain size of natural graphite falls in the range of 20–80 $\mu$m, preferably in the range of 30–60 $\mu$m. Moreover, when the natural graphite content is 16–30 wt. %, further improved results are obtained.

Graphite-added sintered silicon carbide and a sintered composite containing graphite-added sintered silicon carbide of the present invention comprise an α-type silicon carbide having excellent sintering characteristics due to incorporation of a large amount of highly anisotropic graphite grains.

Natural graphite used in the manufacture of the sintered material is in the form of natural graphite flakes having an average grain size of 8–100 μm, preferably 20–80 μm, more preferably 30–60 μm. When natural graphite having an average grain size of 80 μm or less is incorporated, sufficient lubrication characteristics are not obtained in terms of the rubbing characteristics of the mechanical seal, whereas when the grain size is in excess of 100 μm, the strength of the sintered material decreases. The grain size is preferably 20 μm or more, more preferably 30 μm or more, in consideration of lubrication characteristics and preferably 80 μm or less, more preferably 60 μm or less, from the viewpoint of strength.

Natural graphite is incorporated in the sintered material in an amount of 10–30 wt. %, preferably 16–30 wt. %. When natural graphite is incorporated in an amount of less than 10 wt. %, sufficient lubrication characteristics for use as a mechanical seal are not attained and friction upon rubbing is increased to generate heat, thereby promoting burning, scoring, and consequent ringing of a sliding face. Incorporation in an amount of 16 wt. % or more results in more preferable lubrication characteristics. When natural graphite having a large grain size is incorporated in an amount of 30 wt. % or more, the strength of the sintered material decreases to thereby promote detachment of the grains therefrom in rubbing.

The relative density of the graphite-added sintered silicon carbide is regulated to 80–92% so as to form open pores in an amount of 18 vol. % or less. A carbon phase having excellent lubrication ability is provided in the sliding face without substantially lowering the strength due to introduction into the pores of a carbonized thermosetting resin and/or a graphitized product. When a relative density of the graphite-added sintered silicon carbide is less than 80%, the strength of the sintered material decreases disadvantageously, whereas when the relative density is in excess of 92%, sufficient lubrication ability is not imparted to the sliding face and the amount of a carbonized thermosetting resin and/or a graphitized product incorporated into the pores decreases to result in abnormal wearing and scoring at the sliding face, as shown in the below-described Examples.

Another purpose of the introduction of a carbonized thermosetting resin and/or a graphitized product into the pores of the above-described graphite-added sintered silicon carbide is to prevent the leakage of materials to be sealed through the open pores when the sintered material is used as a mechanical seal. When a synthetic resin or a metal—as opposed to a carbonized resin or a graphitized product—is introduced into the open pores of the graphite-added sintered silicon carbide to maintain the sealing ability, there result decreases in the excellent corrosion resistance and heat resistance of the graphite-added sintered silicon carbide.

DESCRIPTION OF THE MANUFACTURING METHOD

A small amount of a sintering aid is required when a silicon carbide powder is sintered. No particular limitation is imposed on the sintering aid, and typical known sintering aids—an alumina type and a boron-carbon type—may used. A boron-carbon type sintering aid is preferred, in view of good corrosion resistance and rubbing characteristics of the sintered material.

Either a β-type silicon carbide powder stable at low temperature or an α-type silicon carbide powder stable at high temperature may be used as a starting powder for sintering. Since a large amount of highly anisotropic graphite grains are incorporated to impart lubrication ability to silicon carbide, α-type silicon carbide is preferred as a starting powder in view of better sintering characteristics. The α-type silicon carbide preferably has an average grain size of 10 μm or less. Moreover, micropowder thereof having an average grain size of 0.7 μm or less is preferred in that it promotes densification and provides higher mechanical strength of the sintered material.

The sintering aid is selected from boron, carbon, aluminum, beryllium, and a compound containing one or more of these elements. Of these, a boron-carbon type sintering aid most facilitates the densification.

The sintering aid is incorporated in an amount of 0.1–1 wt. % in terms of boron. Incorporation of boron in an amount of 0.1 wt. % or less results in insufficient densification, whereas incorporation in an amount of 1 wt. % or more does not result in higher densification commensurate with the amount of the incorporation. Also, an excess amount of boron promotes anomalous growth of silicon carbide crystal grains and lowers the mechanical strength of the sintered material. As the boron source, boron and a compound thereof may be used singly or in combination. Examples of typically used boron sources include amorphous boron, boron carbide, boron nitride, and boron dioxide. Of these, amorphous boron and boron carbide provide stable densification and boron carbide is preferred in that it is economical and easily available.

With regard to a carbon source, a carbonizable organic carbon source or carbon ultrafine powder such as carbon black is used. A phenolic resin and coal tar, both of which are effectively carbonized, are preferred as the organic carbon source.

The required amount of the carbon source depends on the purity of silicon carbide powder to be used, particularly on the oxygen content thereof. The majority of oxygen distributed around the surface of the silicon carbide powder bonds to silicon to form silicon dioxide or silicon oxide having a quasi-glass compositional ratio. Consequently, a carbon source is incorporated in an amount of 0.5–5 wt. % into a silicon carbide powder refined with hydrochloric acid, hydrofluoric acid, or the like, so as to provide satisfactorily-densified sintered silicon carbide.

Natural graphite is incorporated as a solid lubricant in the above-described amount so as to impart rubbing characteristics to sintered silicon carbide. Natural graphite is capable of maintaining stability during the firing of silicon carbide. Natural graphite having a high crystallinity and large grain size is preferred in that it imparts excellent rubbing characteristics.

Examples of a binder typically used for molding include polyvinyl alcohol, coal tar pitch, polyethylene glycol, an acrylic resin, a phenolic resin, and polyvinyl butyral. Of these, a phenolic resin is preferred in that it also works as a sintering aid during the firing of silicon carbide. These starting powders and the binder are blended in predetermined amounts and mixed homogeneously by use of a ball-mill, etc., preferable in a slurry state. Subsequently, the mixture is preferably spray-dried to yield a granule-like powder having a fluidity required for subsequent molding.

The obtained granules are molded by use of a metallic die or through hydrostatic pressing. The pressure in the molding is required to be 1000–4000 kgf/cm². In order to obtain a sintered material having a high density, the granules must be formed into a high-density compact in the molding stage. Also, the compact may further be machine-processed to have a desirable shape.

The obtained compacts are fired at 1900–2300° C. for 30–36 minutes, typically in hydrogen, nitrogen, or an inert gas such as argon or helium, without the application of additional pressure, or in vacuum. When firing is performed for 30 minutes or less, sintering reaction does not proceed, whereas firing for 360 minutes or more results in disadvantageous decomposition of the compacts. When the firing temperature is lower than 1900° C., sufficient densification is not attained, whereas when the temperature is greater than 2300° C., silicon carbide partially sublimates to lower the density. Thus, the firing temperature is more preferably 2050–2200° C.

Open pores contained in graphite-added sintered silicon carbide having a relative density of 80–92% are impregnated with a resin. Examples of resins preferable for such impregnation include effectively carbonized resins such as a phenolic resin, a furan resin, an epoxy resin, pitch, or tar.

Prior to impregnation, the sintered material is degassed in vacuum by use of a vacuum-impregnation apparatus or the like. Impregnation under application of a pressure of 100 kgf/cm² by use of a high-pressure impregnation apparatus is more preferable. Subsequently, the impregnated graphite-added sintered silicon carbide is carbonized at 800–1300° C. in a non-oxidizing atmosphere so as to complete carbonization of the impregnated thermosetting resin. The completely carbonized product is heated to 1900–2300° C. in a non-oxidizing atmosphere for graphitization. When the graphitization is performed at 2200° C. or higher, the silicon carbide matrix decomposes disadvantageously. Through the graphitization, the open pores become covered with a carbonized or graphitized thermosetting resin to provide a surface layer exhibiting excellent lubrication ability as well as to prevent the materials per se from leaking through the pores.

DETAILED DESCRIPTION OF PREFERRED EMBODIMENTS

EXAMPLES

Example 1

The following materials were weighed: 10 kg of α-type silicon carbide powder (average grain size: 0.4 µm, specific surface area: 20 m²/g), 0.5 wt. % (50 g) of B$_4$C powder as a sintering aid, 2.0 wt. % (200 g) of carbon black having a specific surface area of 200 m²/g, and 20.0 wt. % (2,000 g) of commercially available natural graphite; i.e., natural graphite flakes having a maximum grain size of not more than 149 µm and an average grain size of 45 µm. An aqueous solution of polyvinyl alcohol (PVA)—which was used as a binder—as added to the above in an amount of 1.5 wt. % as reduced to the solid content. These materials were placed in a ball mill and mixed for 24 hours. The resultant slurry in the form of a homogeneous mixture was spray-dried by use of a spray drier so as to obtain granules.

The granules were charged in a metallic press, premolded under pressure of 250 kg/cm², and subsequently molded by use of a cold isostatic press method under pressure of 3,000 kg/cm², to thereby obtain molded products. The molded products were machined to yield stationary and rotating rings having predetermined sizes shown in Table 1.

The thus-machined pieces were sintered under conditions of a temperature elevation rate of 5° C./minute and retention for four hours at 2,200° C. in an argon atmosphere.

The density of the sintered pieces as determined by the Archimedes method was 2.78 g/cm³. The relative density was about 92%, and the open pore ratio was 3 vol. %.

Figure 1A:
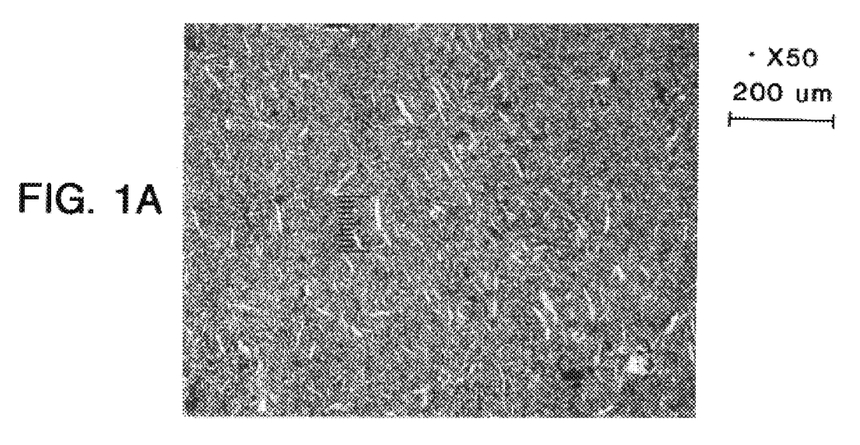
FIG. 1 shows micrographs of surface properties of graphite-added sintered silicon carbide obtained in Example 1.
Figure 1B:
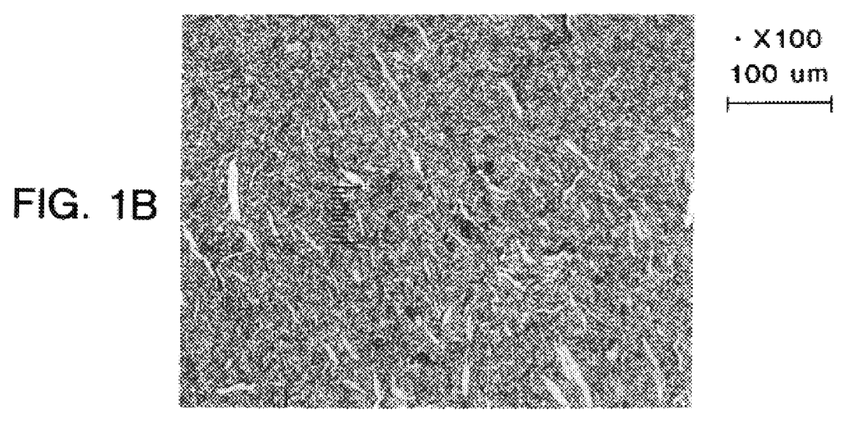
Figure 1C:
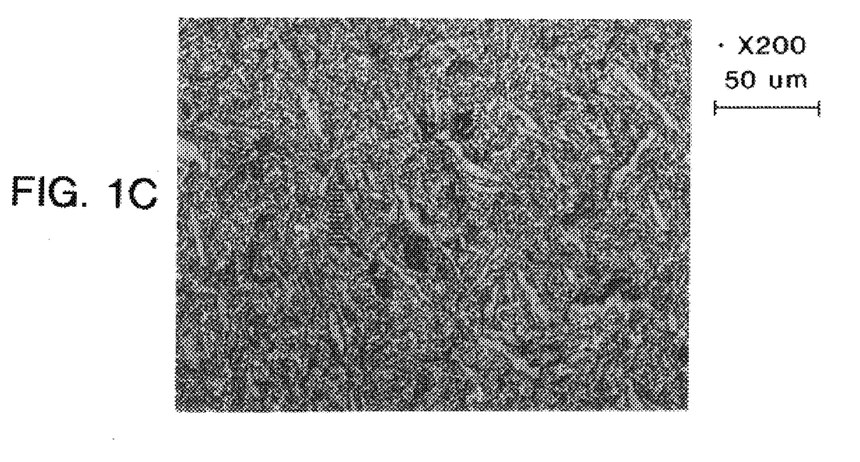

In polished surfaces of the resultant pieces, flake-shaped graphite grains having a size ranging from several microns to one hundred and several dozens of microns were found to be uniformly dispersed in the silicon carbide crystals. In FIG. 1, white needles are the graphite flakes.

The sintered pieces were placed in a vacuum impregnation apparatus, and after the interior portions of the pieces were sufficiently vacuum-degassified, a phenolic resin was introduced by use of a high pressure impregnation apparatus. Subsequently, the resin was carbonized in a nitrogen atmosphere. Graphitization was performed in an atmosphere of nitrogen by use of a graphitizing furnace. The resultant graphitized products were tested for leakage under air pressure of 6 kgf/cm²G, proving absence of air leakage.

After the thus-obtained products of sintered composite containing graphite-added sintered silicon carbide were subjected to lapping to obtain a surface having a surface roughness of 0.2 µm, a rubbing test was performed. Parameters of the rubbing test performed under dry conditions are shown in Table 1.

As is apparent from the test results shown in Table 3, substantially no wear was observed, with no ringing of sliding face, and no seizure and no scoring in sliding surfaces.

The parameters of another rubbing test performed in the presence of hot water are shown in Table 3. As is apparent from the rubbing test results shown in Table 4, the sliding torque was as small as 17 kgcm, and during overhaulinspection, excellent characteristics were proven, with no seizure or scoring in sliding surfaces.

Example 2

The following materials were weighed: 10 kg of α-type silicon carbide powder (average grain size: 0.4 µm, specific surface area: 20 m²/g), 0.135 wt. % (13.5 g) of B$_4$C powder as a sintering aid, 2.0 wt. % (200 g) of carbon black having a specific surface area of 200 m²/g, and 16 wt. % (1,600 g) of commercially available natural graphite; i.e., natural graphite flakes having a maximum grain size of not more than 149 µm and an average grain size of 60 µm. An aqueous solution of PVA—which was used as a binder—as added to the above in an amount of 1.5 wt. % as reduced to the solid content. These materials were placed in a ball mill and mixed for 24 hours. The resultant slurry in the form of a homogeneous mixture was spray-dried by use of a spray drier so as to obtain granules. The granules were charged in a metallic press, pre-molded under pressure of 250 kgf/cm², and subsequently molded by use of a cold isostatic press method under pressure of 3,000 kgf/cm², to thereby obtain molded products. The molded products were machined to yield stationary and rotating rings having predetermined sizes shown in Table 1. The thus-machined pieces were sintered under conditions of a temperature elevation rate of 5° C./minute and retention for four hours at 2,200° C. in an argon atmosphere. The density of the sintered pieces as determined by the Archimedes method was 2.81 g/cm³. The relative density was about 92%, and the open pore ratio was 3 vol. %. In polished surfaces of the resultant pieces, flake-shaped graphite grains having a size ranging from several microns to one hundred and several dozens of microns were found to be uniformly dispersed in the silicon carbide crystals. The sintered pieces were placed in a vacuum impregnation apparatus, and after the interior portions of the pieces were sufficiently vacuum-degassified, a phenolic resin was introduced by use of a high pressure impregnation apparatus. Subsequently, the resin was carbonized in a furnace under nitrogen. The resultant sintered composite containing graphite-added sintered silicon carbide was tested for leakage under air pressure of 6 kgf/cm²G, proving absence of air leakage.

After the thus-obtained products of sintered composite containing graphite-added sintered silicon carbide were subjected to lapping to obtain a surface having a surface roughness of 0.2 μm, a rubbing test was performed. Parameters of the rubbing test performed under dry conditions are shown in Table 1.

As is apparent from the test results shown in Table 3, substantially no wear was observed, with no ringing of sliding face, and neither seizure nor scoring in sliding surfaces.

Example 3

The following materials were weighed: 10 kg of α-type silicon carbide powder (average grain size: 0.4 μm, specific surface area: 20 m²/g), 0.5 wt. % (50 g) of B₄C powder as a sintering aid, 5 wt. % (500 g) of phenolic resin, and 15 wt. % (with respect to silicon carbide powder; 1,500 g) of commercially available natural graphite; i.e., natural graphite flakes having a maximum grain size of not more than 149 μm and an average grain size of about 45 μm. A mixture of water and ethanol (1:10) was added to the resultant slurry to make the slurry concentration 10 wt. %. These materials were placed in a ball mill and mixed for 24 hours. The resultant slurry in the form of a homogeneous mixture was spray-dried by use of a spray drier so as to obtain granules. The granules were charged in a metallic press, pre-molded under pressure of 250 kgf/cm², and subsequently molded by use of a cold isostatic press method under pressure of 2,800 kgf/cm², to thereby obtain molded products. The molded products were machined to yield stationary and rotating rings having predetermined sizes shown in Table 1. The thus-machined pieces were sintered under conditions of a temperature elevation rate of 5° C./minute and retention for four hours at 2,200° C. in an argon atmosphere. The density of the thus-obtained graphite-added sintered silicon carbide as determined by the Archimedes method was 2.75 g/cm³. The relative density was 90%, and the open pore ratio was 6 vol. %. In polished surfaces of the resultant pieces, flake-shaped graphite grains having a size ranging from several microns to one hundred and several dozens of microns were found to be uniformly dispersed in the silicon carbide crystals. The sintered pieces were placed in a vacuum impregnation apparatus, and after the interior portions of the pieces were sufficiently vacuum-degassified, a phenolic resin was introduced by use of a high pressure impregnation apparatus. Subsequently, the resin was carbonized in a furnace under nitrogen. The resultant sintered composite containing graphite-added sintered silicon carbide was tested for leakage under air pressure of 6 kgf/cm²G, proving absence of air leakage.

After the thus-obtained products of sintered composite containing graphite-added sintered silicon carbide were subjected to lapping to obtain a surface having a surface roughness of 0.2 μm, a rubbing test was performed. Parameters of the rubbing test performed under dry conditions are shown in Table 1. As is apparent from the test results shown in Table 3, wear loss was about 21 μm/year, with slight ringing of sliding face, and a trace of slight scoring found in sliding surfaces. However, these results are considered to raise no problem for practice use.

Example 4

The following materials were weighed: 10 kg of α-type silicon carbide powder (average grain size: 0.4 μm, specific surface area: 20 m²/g), 0.135 wt. % (13.5 g) of B₄C powder as a sintering aid, 2.0 wt. % (200 g) of carbon black having a specific surface area of 200 m²/g, and 11.2 wt. % (1,120 g) of commercially available natural graphite; i.e., natural graphite flakes having a maximum grain size of not more than 149 μm and an average grain size of 45 μm. An aqueous solution of PVA—which was used as a binder—was added to the above in an amount of 1.5 wt. % as reduced to the solid content. These materials were placed in a ball mill and mixed for 24 hours. The resultant slurry in the form of a homogeneous mixture was spray-dried by use of a spray drier so as to obtain granules. The granules were charged in a metallic press, pre-molded under pressure of 250 kgf/cm², and subsequently molded by use of a cold isostatic press method under pressure of 1,500 kgf/cm², to thereby obtain molded products. The molded products were machined to yield stationary and rotating rings having predetermined sizes shown in Table 1. The thus-machined pieces were sintered under conditions of a temperature elevation rate of 5° C./minute and retention for four hours at 2,200° C. in an argon atmosphere. The density of the sintered pieces as determined by the Archimedes method was 2.63 g/cm³. The relative density was about 85%, and the open pore ratio was 11 vol. %. The sintered pieces were placed in a vacuum impregnation apparatus, and after the interior portions of the pieces were sufficiently vacuum-degassified, a phenolic resin was introduced by use of a high pressure impregnation apparatus. Subsequently, the resin was carbonized in a furnace under nitrogen. The resultant composite was tested for leakage under air pressure of 6 kgf/cm²G, proving absence of air leakage.

After the thus-obtained products of sintered composite containing graphite-added sintered silicon carbide were subjected to lapping to obtain a surface having a surface roughness of 0.2 μm, a rubbing test was performed. Parameters of the rubbing test performed under dry conditions are shown in Table 1.

As is apparent from the test results shown in Table 2, wear loss is about 13 μm/year, with ringing of sliding face, and a trace of slight scoring found in sliding surfaces. However, these results are considered to raise no problem for practice use.

Example 5

The following materials were weighed: 10 kg of α-type silicon carbide powder (average grain size: 0.4 μm, specific surface area: 20 m²/g), 0.5 wt. % (50 g) of B₄C powder as a sintering aid, 5 wt. % (500 g) of phenolic resin, and 30 wt. % (with respect to silicon carbide powder; 3,000 g) of commercially available natural graphite; i.e., natural graphite flakes having a maximum grain size of not more than 149 μm and an average grain size of 45 μm. A mixture of water and ethanol (1:10) was added to the resultant slurry to make the slurry concentration 10 wt. %. These materials were placed in a ball mill and mixed for 24 hours. The resultant slurry in the form of a homogeneous mixture was spray-dried by use of a spray drier so as to obtain granules. The granules were charged in a metallic press, pre-molded under pressure of 250 kgf/cm², and subsequently molded by use of a cold isostatic press method under pressure of 1,500 kgf/cm², to thereby obtain molded products. The molded products were machined to yield stationary and rotating rings having predetermined sizes shown in Table 1. The thus-machined pieces were sintered under conditions of a temperature elevation rate of 5° C./minute and retention for four hours at 2,200° C. in an argon atmosphere. The density of the sintered pieces as determined by the Archimedes method was 2.48 g/cm³. The relative density was about 85%, and the open pore ratio was 12 vol. %. In polished surfaces of the resultant pieces, flake-shaped graphite grains having a size ranging from several microns to one hundred and several dozens of microns were found to be uniformly dispersed in the silicon carbide crystals. The sintered pieces were placed in a vacuum impregnation apparatus, and after the interior portions of the pieces were sufficiently vacuum-degassified, a phenolic resin was introduced by use of a high pressure impregnation apparatus. Subsequently, the resin was carbonized in a furnace under nitrogen. The resultant composite was tested for leakage under air pressure of 6 kgf/cm²G, proving absence of air leakage.

After the thus-obtained products of sintered composite containing graphite-added sintered silicon carbide were subjected to lapping to obtain a surface having a surface roughness of 0.2 μm, a rubbing test was performed. Parameters of the rubbing test performed under dry conditions are shown in Table 1. As is apparent from the test results shown in Table 3, substantially no wear was observed, with no ringing of sliding face, and neither seizure nor scoring in sliding surfaces.

The parameters of another rubbing test performed in the presence of hot water are shown in Table 2. As is apparent from the rubbing test results shown in Table 4, the sliding torque was as small as 20 kgcm, and during overhaul inspection, excellent characteristics were proven, with no seizure or scoring in sliding surfaces.

Example 6

The following materials were weighed: 10 kg of α-type silicon carbide powder (average grain size: 0.4 μm, specific surface area: 20 m²/g), 0.5 wt. % (50 g) of B₄C powder as a sintering aid, 5 wt. % (500 g) of phenolic resin, and 30 wt. % (3,000 g) of commercially available natural graphite; i.e., natural graphite flakes having a maximum grain size of not more than 149 μm and an average grain size of 8 μm. A mixture of water and ethanol (1:10) was added to the resultant slurry to make the slurry concentration 10 wt. %. These materials were placed in a ball mill and mixed for 24 hours. The resultant slurry in the form of a homogeneous mixture was spray-dried by use of a spray drier so as to obtain granules. The granules were charged in a metallic press, pre-molded under pressure of 250 kgf/cm², and subsequently molded by use of a cold isostatic press method under pressure of 2,500 kgf/cm², to thereby obtain molded products. The molded products were machined to yield stationary and rotating rings having predetermined sizes shown in Table 1. The thus-machined pieces were sintered under conditions of a temperature elevation rate of 5° C./minute and retention for four hours at 2,200° C. in an argon atmosphere. The density of the sintered pieces as determined by the Archimedes method was 2.62 g/cm³. The relative density was about 90%, and the open pore ratio was 6 vol. %. In polished surfaces of the resultant pieces, flake-shaped graphite grains having a size ranging from several microns to one hundred and several dozens of microns were found to be uniformly dispersed in the silicon carbide crystals. The sintered pieces were placed in a vacuum impregnation apparatus, and after the interior portions of the pieces were sufficiently vacuum-degassified, a phenolic resin was introduced by use of a high pressure impregnation apparatus. Subsequently, the resin was carbonized in a furnace under nitrogen. The resultant composite was tested for leakage under air pressure of 6 kgf/cm²G, proving absence of air leakage.

After the thus-obtained products of sintered composite containing graphite-added sintered silicon carbide were subjected to lapping to obtain a surface having a surface roughness of 0.2 μm, a rubbing test was performed. Parameters of the rubbing test performed under dry conditions are shown in Table 1. As is apparent from the test results shown in Table 3, wear loss was 40 μm/year, with slight ringing of sliding face and slight scoring in sliding surfaces. However, these results are considered to raise no problem for practice use.

Example 7

The following materials were weighed: 10 kg of α-type silicon carbide powder (average grain size: 0.4 μm, specific surface area: 20 m²/g), 0.5 wt. % (50 g) of B₄C powder as a sintering aid, 5 wt. % (500 g) of phenolic resin, and 11.2 wt. % (1,120 g) of commercially available natural graphite; i.e., natural graphite flakes having a maximum grain size of not more than 149 μm and an average grain size of about 100 μm. A mixture of water and ethanol (1:10) was added to the resultant slurry to make the slurry concentration 10 wt. %. These materials were placed in a ball mill and mixed for 24 hours. The resultant slurry in the form of a homogeneous mixture was spray-dried by use of a spray drier so as to obtain granules. The granules were charged in a metallic press, pre-molded under pressure of 250 kgf/cm², and subsequently molded by use of a cold isostatic press method under pressure of 3,000 kgf/cm², to thereby obtain molded products. The molded products were machined to yield stationary and rotating rings having predetermined sizes shown in Table 1. The thus-machined pieces were sintered under conditions of a temperature elevation rate of 5° C./minute and retention for four hours at 2,200° C. in an argon atmosphere. The density of the sintered pieces as determined by the Archimedes method was 2.86 g/cm³. The relative density was about 92%, and the open pore ratio was 3 vol. %. In polished surfaces of the resultant pieces, flake-shaped graphite grains having a size ranging from several microns to one hundred and several dozens of microns were found to be uniformly dispersed in the silicon carbide crystals. The sintered pieces were placed in a vacuum impregnation apparatus, and after the interior portions of the pieces were sufficiently vacuum-degassified, a phenolic resin was introduced by use of a high pressure impregnation apparatus. Subsequently, the resin was carbonized in a furnace under nitrogen. The resultant composite was tested for leakage under air pressure of 6 kgf/cm²G, proving absence of air leakage.

After the thus-obtained products of sintered composite containing graphite-added sintered silicon carbide were subjected to lapping to obtain a surface having a surface roughness of 0.2 μm, a rubbing test was performed. Parameters of the rubbing test performed under dry conditions are shown in Table 1. As is apparent from the test results shown in Table 3, wear loss is 60 μm/year, with no ringing of sliding face, and slight scoring in sliding surfaces due to chipping caused by reduction in strength. However, these results are considered to raise no problem for practice use.

Example 8

The following materials were weighed: 10 kg of μ-type silicon carbide powder (average grain size: 0.4 μm, specific surface area: 20 m²/g), 0.135 wt. % (13.5 g) of $B_4C$ powder as a sintering aid, 2.0 wt. % (200 g) of carbon black having a specific surface area of 200 m²/g, and 16 wt. % (with respect to silicon carbide powder; 1,600 g) of commercially available natural graphite; i.e., natural graphite flakes having a maximum grain size of not more than 149 μm and an average grain size of about 20 μm. An aqueous solution of PVA—which was used as a binder—as added to the above in an amount of 1.5 wt. % as reduced to the solid content. These materials were placed in a ball mill and mixed for 24 hours. The resultant slurry in the form of a homogeneous mixture was spray-dried by use of a spray drier so as to obtain granules. The granules were charged in a metallic press, pre-molded under pressure of 250 kgf/cm², and subsequently molded by use of a cold isostatic press method under pressure of 3,000 kgf/cm², to thereby obtain molded products. The molded products were machined to yield stationary and rotating rings having predetermined sizes shown in Table 1. The thus-machined pieces were sintered under conditions of a temperature elevation rate of 5° C./minute and retention for four hours at 2,200° C. in an argon atmosphere. The density of the sintered pieces as determined by the Archimedes method was 2.81 g/cm³. The relative density was about 92%, and the open pore ratio was 3 vol. %. In polished surfaces of the resultant pieces, flake-shaped graphite grains having a size ranging from several microns to one hundred and several dozens of microns were found to be uniformly dispersed in the silicon carbide crystals. The sintered pieces were placed in a vacuum impregnation apparatus, and after the interior portions of the pieces were sufficiently vacuum-degassified, a phenolic resin was introduced by use of a high pressure impregnation apparatus. Subsequently, the resin was carbonized in a furnace under nitrogen. The resultant composite was tested for leakage under air pressure of 6 kgf/cm²G, proving absence of air leakage.

After the thus-obtained products of sintered composite containing graphite-added sintered silicon carbide were subjected to lapping to obtain a surface having a surface roughness of 0.2 μm, a rubbing test was performed. Parameters of the rubbing test performed under dry conditions are shown in Table 1. As is apparent from the test results shown in Table 3, wear loss was 26 μm/year, with very slight ringing of sliding face and slight scoring in sliding surfaces. However, these results are considered to raise no problem for practice use.

Example 9

The following materials were weighed: 10 kg of α-type silicon carbide powder (average grain size: 0.4 μm, specific surface area: 20 m²/g), 0.135 wt. % (13.5 g) of $B_4C$ powder as a sintering aid, 2.0 wt. % (200 g) of carbon black having a specific surface area of 200 m²/g, and 16 wt. % (with respect to silicon carbide powder; 1,600 g) of commercially available natural graphite; i.e., natural graphite flakes having a maximum grain size of not more than 149 μm and an average grain size of about 80 μm. An aqueous solution of PVA—which was used as a binder—was added to the above in an amount of 1.5 wt. % as reduced to the solid content. These materials were placed in a ball mill and mixed for 24 hours. The resultant slurry in the form of a homogeneous mixture was spray-dried by use of a spray drier so as to obtain granules. The granules were charged in a metallic press, pre-molded under pressure of 250 kgf/cm², and subsequently molded by use of a cold isostatic press method under pressure of 2,800 kgf/cm², to thereby obtain molded products. The molded products were machined to yield stationary and rotating rings having predetermined sizes shown in Table 1. The thus-machined pieces were sintered under conditions of a temperature elevation rate of 5° C./minute and retention for four hours at 2,200° C. in an argon atmosphere. The density of the sintered pieces as determined by the Archimedes method was 2.81 g/cm³. The relative density was about 92%, and the open pore ratio was 3 vol. %. In polished surfaces of the resultant pieces, flake-shaped graphite grains having a size ranging from several microns to one hundred and several dozens of microns were found to be uniformly dispersed in the silicon carbide crystals. The sintered pieces were placed in a vacuum impregnation apparatus, and after the interior portions of the pieces were sufficiently vacuum-degassified, a phenolic resin was introduced by use of a high pressure impregnation apparatus. Subsequently, the resin was carbonized in a furnace under nitrogen. The resultant composite was tested for leakage under air pressure of 6 kgf/cm²G, proving absence of air leakage.

After the thus-obtained products of sintered composite containing graphite-added sintered silicon carbide were subjected to lapping to obtain a surface having a surface roughness of 0.2 μm, a rubbing test was performed. Parameters of the rubbing test performed under dry conditions are shown in Table 1. As is apparent from the test results shown in Table 3, wear loss was 35 μm/year, with no ringing of sliding face but slight scoring in sliding surfaces. However, these results are considered to raise no problem for practice use.

Example 10

The following materials were weighed: 10 kg of α-type silicon carbide powder (average grain size: 0.4 μm, specific surface area: 20 m²/g), 0.135 wt. % (13.5 g) of $B_4C$ powder as a sintering aid, 2.0 wt. % (200 g) of carbon black having a specific surface area of 200 m²/g, and 16 wt. % (with respect to silicon carbide powder; 1,600 g) of commercially available natural graphite; i.e., natural graphite flakes having a maximum grain size of not more than 149 μm and an average grain size of about 30 μm. An aqueous solution of PVA—which was used as a binder—as added to the above in an amount of 1.5 wt. % as reduced to the solid content. These materials were placed in a ball mill and mixed for 24 hours. The resultant slurry in the form of a homogeneous mixture was spray-dried by use of a spray drier so as to obtain granules. The granules were charged in a metallic press, pre-molded under pressure of 250 kgf/cm², and subsequently molded by use of a cold isostatic press method under pressure of 3,000 kgf/cm², to thereby obtain molded products. The molded products were machined to yield stationary and rotating rings having predetermined sizes shown in Table 1. The thus-machined pieces were sintered under conditions of a temperature elevation rate of 5° C./minute and retention for four hours at 2,200° C. in an argon atmosphere. The density of the sintered pieces as determined by the Archimedes method was 2.81 g/cm³. The relative density was about 92%, and the open pore ratio was 3 vol. %. In polished surfaces of the resultant pieces, flake-shaped graphite grains having a size ranging from several microns to one hundred and several dozens of microns were found to be uniformly dispersed in the silicon carbide crystals. The sintered pieces were placed in a vacuum impregnation apparatus, and after the interior portions of the pieces were sufficiently vacuum-degassified, a phenolic resin was introduced by use of a high pressure impregnation apparatus. Subsequently, the resin was carbonized in a furnace under nitrogen. The resultant composite was tested for leakage under air pressure of 6 kgf/cm²G, proving absence of air leakage.

After the thus-obtained products of sintered composite containing graphite-added sintered silicon carbide were subjected to lapping to obtain a surface having a surface roughness of 0.2 μm, a rubbing test was performed. Parameters of the rubbing test performed under dry conditions are shown in Table 1. As is apparent from the test results shown in Table 3, excellent results were obtained; wear loss was 14 μm/year, with no ringing of sliding face and no scoring in sliding surfaces.

Example 11

The following materials were weighed: 10 kg of α-type silicon carbide powder (average grain size: 0.4 μm, specific surface area: 20 m²/g), 0.135 wt. % (13.5 g) of $B_4C$ powder as a sintering aid, 2.0 wt. % (200 g) of carbon black having a specific surface area of 200 m²/g, and 16 wt. % (with respect to silicon carbide powder; 1,600 g) of commercially available natural graphite; i.e., natural graphite flakes having a maximum grain size of not more than 149 μm and an average grain size of about 30 μm. An aqueous solution of PVA—which was used as a binder—as added to the above in an amount of 1.5 wt. % as reduced to the solid content. These materials were placed in a ball mill and mixed for 24 hours. The resultant slurry in the form of a homogeneous mixture was spray-dried by use of a spray drier so as to obtain granules. The granules were charged in a metallic press, pre-molded under pressure of 250 kgf/cm², and subsequently molded by use of a cold isostatic press method under pressure of 1,500 kgf/cm², to thereby obtain molded products. The molded products were machined to yield stationary and rotating rings having predetermined sizes shown in Table 1. The thus-machined pieces were sintered under conditions of a temperature elevation rate of 5° C./minute and retention for four hours at 2,200° C. in an argon atmosphere. The density of the sintered pieces as determined by the Archimedes method was 2.60 g/cm³. The relative density was about 85%, and the open pore ratio was 12 vol. %. In polished surfaces of the resultant pieces, flake-shaped graphite grains having a size ranging from several microns to one hundred and several dozens of microns were found to be uniformly dispersed in the silicon carbide crystals. The sintered pieces were placed in a vacuum impregnation apparatus, and after the interior portions of the pieces were sufficiently vacuum-degassified, a phenolic resin was introduced by use of a high pressure impregnation apparatus. Subsequently, the resin was carbonized in a furnace under nitrogen. The resultant composite was tested for leakage under air pressure of 6 kgf/cm²G, proving absence of air leakage.

After the thus-obtained products of sintered composite containing graphite-added sintered silicon carbide were subjected to lapping to obtain a surface having a surface roughness of 0.2 μm, a rubbing test was performed. Parameters of the rubbing test performed under dry conditions are shown in Table 1. As is apparent from the test results shown in Table 3, excellent results were obtained; wear loss was 10 μm/year, with no ringing of sliding face and no scoring in sliding surfaces.

Example 12

The following materials were weighed: 10 kg of α-type silicon carbide powder (average grain size: 0.4 μm, specific surface area: 20 m²/g), 0.5 wt. % (50 g) of $B_4C$ powder as a sintering aid, 2.0 wt. % (200 g) of carbon black having a specific surface area of 200 m²/g, and 16 wt. % (1,600 g) of commercially available natural graphite; i.e., natural graphite flakes having a maximum grain size of not more than 149 μm and an average grain size of 60 μm. An aqueous solution of polyvinyl alcohol (PVA)—which was used as a binder—as added to the above in an amount of 1.5 wt. % as reduced to the solid content. These materials were placed in a ball mill and mixed for 24 hours. The resultant slurry in the form of a homogeneous mixture was spray-dried by use of a spray drier so as to obtain granules.

The granules were charged in a metallic press, premolded under pressure of 250 kgf/cm², and subsequently molded by use of a cold isostatic press method under pressure of 3,000 kgf/cm², to thereby obtain molded products. The molded products were machined to yield stationary and rotating rings having predetermined sizes shown in Table 1.

The thus-machined pieces were sintered under conditions of a temperature elevation rate of 5° C./minute and retention for four hours at 2,200° C. in an argon atmosphere.

The density of the sintered pieces as determined by the Archimedes method was 2.81 g/cm³. The relative density was about 92%, and the open pore ratio was 3 vol. %.

In polished surfaces of the resultant pieces, flake-shaped graphite grains having a size ranging from several microns to one hundred and several dozens of microns were found to be uniformly dispersed in the silicon carbide crystals.

After the thus-obtained products of sintered composite containing graphite-added sintered silicon carbide were subjected to lapping to obtain a surface having a surface roughness of 0.2 μm, a rubbing test was performed. Parameters of the rubbing test performed under hot water conditions are shown in Table 2. As is apparent from the test results shown in Table 4, 0.5 cc/hour of leak constantly occurred since no impregnation-and-carbonization was performed. However, the drive torque was very small (19 kgcm), and neither scoring nor surface damage was observed in sliding surfaces when an overhaul inspection was performed.

Example 13

The following materials were weighed: 10 kg of α-type silicon carbide powder (average grain size: 0.4 μm, specific surface area: 20 m²/g), 0.5 wt. % (50 g) of $B_4C$ powder as a sintering aid, 5 wt. % (500 g) of phenolic resin, and 16 wt. % (with respect to silicon carbide powder; 1,600 g) of commercially available natural graphite; i.e., natural graphite flakes having a maximum grain size of not more than 149 μm and an average grain size of about 80 am. A mixture of water and ethanol (1:10) was added to the resultant slurry to make the slurry concentration 10 wt. %. These materials were placed in a ball mill and mixed for 24 hours. The resultant slurry in the form of a homogeneous mixture was spray-dried by use of a spray drier so as to obtain granules. The granules were charged in a metallic press, pre-molded under pressure of 250 kgf/cm², and subsequently molded by use of a cold isostatic press method under pressure of 2,800 kgf/cm², to thereby obtain molded products. The molded products were machined to yield stationary and rotating rings having predetermined sizes shown in Table 1. The thus-machined pieces were sintered under conditions of a temperature elevation rate of 5° C./minute and retention for four hours at 2,200° C. in an argon atmosphere. The density of the thus-obtained graphite-added sintered silicon carbide as determined by the Archimedes method was 2.75 g/cm³. The relative density was 90%, and the open pore ratio was 6 vol. %. In polished surfaces of the resultant pieces, flake-shaped graphite grains having a size ranging from several microns to one hundred and several dozens of microns were found to be uniformly dispersed in the silicon carbide crystals.

After the thus-obtained products of sintered composite containing graphite-added sintered silicon carbide were subjected to lapping to obtain a surface having a surface roughness of 0.2 am, a rubbing test was performed. Parameters of the rubbing test performed under hot water conditions are shown in Table 2. As is apparent from the test results shown in Table 4, 1.0 cc/hour of leak occurred since no impregnation-and-carbonization was performed. However, the drive torque was very small (21 kgcm), and neither scoring nor surface damage was observed in sliding surfaces after the test.

Example 14

The following materials were weighed: 10 kg of α-type silicon carbide powder (average grain size: 0.4 am, specific surface area: 20 m²/g), 0.5 wt. % (50 g) of B₄C powder as a sintering aid, 2.0 wt. % (200 g) of carbon black having a specific surface area of 200 m²/g, and 30 wt. % (3,000 g) of commercially available natural graphite; i.e., natural graphite flakes having a maximum grain size of not more than 149 μm and an average grain size of 60 Em. An aqueous solution of polyvinyl alcohol (PVA)—which was used as a binder— as added to the above in an amount of 1.5 wt. % as reduced to the solid content. These materials were placed in a ball mill and mixed for 24 hours. The resultant slurry in the form of a homogeneous mixture was spray-dried by use of a spray drier so as to obtain granules.

The granules were charged in a metallic press, pre-molded under pressure of 250 kg/cm², and subsequently molded by use of a cold isostatic press method under pressure of 2,800 kg/cm², to thereby obtain molded products. The molded products were machined to yield stationary and rotating rings having predetermined sizes shown in Table 1.

The thus-machined pieces were sintered under conditions of a temperature elevation rate of 5° C./minute and retention for four hours at 2,200° C. in an argon atmosphere.

The density of the sintered pieces as determined by the Archimedes method was 2.63 g/cm³. The relative density was about 90%, and the open pore ratio was 6 vol. %.

In polished surfaces of the resultant pieces, flake- shaped graphite grains having a size ranging from several microns to one hundred and several dozens of microns were found to be uniformly dispersed in the silicon carbide crystals.

After the thus-obtained products of sintered composite containing graphite-added sintered silicon carbide were subjected to lapping to obtain a surface having a surface roughness of 0.2 μm, a rubbing test was performed. Parameters of the rubbing test performed under hot water conditions are shown in Table 2. As is apparent from the test results shown in Table 4, 1.2 cc/hour of leak constantly occurred since no impregnation-and-carbonization was performed. However, the drive torque was very small (17 kgcm), and neither scoring nor surface damage was observed in sliding surfaces after the test.

Example 15

The following materials were weighed: 10 kg of α-type silicon carbide powder (average grain size: 0.4 μm, specific surface area: 20 m²/g), 0.5 wt. % (50 g) of B₄C powder as a sintering aid, 2.0 wt. % (200 g) of carbon black having a specific surface area of 200 m²/g, and 16 wt. % (1,600 g) of commercially available natural graphite; i.e., natural graphite flakes having a maximum grain size of not more than 149 μm and an average grain size of 30 μm. An aqueous solution of polyvinyl alcohol (PVA)—which was used as a binder— as added to the above in an amount of 1.5 wt. % as reduced to the solid content. These materials were placed in a ball mill and mixed for 24 hours. The resultant slurry in the form of a homogeneous mixture was spray-dried by use of a spray drier so as to obtain granules. The granules were charged in a metallic press, pre-molded under pressure of 250 kg/cm², and subsequently molded by use of a cold isostatic press method under pressure of 1,500 kg/cm², to thereby obtain molded products. The molded products were machined to yield stationary and rotating rings having predetermined sizes shown in Table 1. The thus-machined pieces were sintered under conditions of a temperature elevation rate of 5° C./minute and retention for four hours at 2,200° C. in an argon atmosphere. The density of the sintered pieces as determined by the Archimedes method was 2.60 g/cm³. The relative density was about 85%, and the open pore ratio was 12 vol. %. In polished surfaces of the resultant pieces, flake-shaped graphite grains having a size ranging from several microns to one hundred and several dozens of microns were found to be uniformly dispersed in the silicon carbide crystals. After the thus-obtained products of sintered composite containing graphite-added sintered silicon carbide were subjected to lapping to obtain a surface having a surface roughness of 0.2 μm, a rubbing test was performed. Parameters of the rubbing test performed under hot water conditions are shown in Table 2. As is apparent from the test results shown in Table 4, 2.8 cc/hour of leak constantly occurred since no impregnation-and-carbonization was performed. However, the drive torque was very small (20 kgcm), and neither scoring nor surface damage was observed in sliding surfaces after the test.

Example 16

The following materials were weighed: 10 kg of α-type silicon carbide powder (average grain size: 0.4 μm, specific surface area: 20 m²/g), 0.5 wt. % (50 g) of B₄C powder as a sintering aid, 2.0 wt. %0 (200 g) of carbon black having a specific surface area of 200 m²/g, and 11.2 wt. % (1,120 g) of commercially available natural graphite; i.e., natural graphite flakes having a maximum grain size of not more than 149 μm and an average grain size of 20 μm. An aqueous solution of polyvinyl alcohol (PVA)—which was used as a binder—as added to the above in an amount of 1.5 wt. % as reduced to the solid content. These materials were placed in a ball mill and mixed for 24 hours. The resultant slurry in the form of a homogeneous mixture was spray-dried by use of a spray drier so as to obtain granules.

The granules were charged in a metallic press, pre-molded under pressure of 250 kg/cm², and subsequently molded by use of a cold isostatic press method under pressure of 2,700 kg/cm², to thereby obtain molded products. The molded products were machined to yield stationary and rotating rings having predetermined sizes shown in Table 1.

The thus-machined pieces were sintered under conditions of a temperature elevation rate of 5° C./minute and retention for four hours at 2,200° C. in an argon atmosphere.

The density of the sintered pieces as determined by the Archimedes method was 2.79 g/cm³. The relative density was about 90%, and the open pore ratio was 6 vol. %.

In polished surfaces of the resultant pieces, flake-shaped graphite grains having a size ranging from several microns to one hundred and several dozens of microns were found to be uniformly dispersed in the silicon carbide crystals.

After the thus-obtained products of sintered composite containing graphite-added sintered silicon carbide were subjected to lapping to obtain a surface having a surface roughness of 0.2 μm, a rubbing test was performed. Parameters of the rubbing test performed under hot water conditions are shown in Table 2. As is apparent from the test results shown in Table 4, 1.1 cc/hour of leak constantly occurred since no impregnation-and-carbonization was performed. However, the drive torque was 23 kgcm, which was a little higher than that in Examples 12 to 15 but much smaller than that in Comparative Examples 1 and 6 shown in Table 4. Slight scoring and surface damage were observed in sliding surfaces after the test. However, these results are considered to raise no problem for practice use.

Comparative Example 1 (a case in which no graphite was added)

The procedure of Example 1 was repeated except that natural graphite was not used, to thereby produce sintered silicon carbide. The density of the resultant sintered pieces as determined by the Alchimedes method was 3.17 g/cm³ and the relative density was about 98%. The open pore ratio was 0 vol. %. The sintered pieces were subjected to a rubbing test under the test conditions shown in Table 1 and dry conditions. As is apparent from the test results shown in Table 3, extraordinary wear loss and loud ringing of sliding face resulted, and during overhaul inspection, a trace of considerable scoring in sliding surfaces was observed. Thus the function of mechanical seal was not exerted.

Independently, the test pieces were subjected to a rubbing test under hot water conditions shown in Table 2. As shown in Table 4, the drive torque was as high as 39 kgcm. In addition, considerable scoring and accompanying thermal cracks were observed in sliding surfaces during overhaul inspection.

Comparative Example 2-1 (case 1 which showed poor results due to excessive density)

The following materials were weighed: 10 kg of α-type silicon carbide powder (average grain size: 0.4 μm, specific surface area: 20 m²/g), 0.5 wt. % (50 g) of B₄C powder as a sintering aid, 2.0 wt. % (200 g) of carbon black having a specific surface area of 200 m²/g, and 10 wt. % (with respect to silicon carbide powder; 1,000 g) of commercially available natural graphite; i.e., natural graphite flakes having an average grain size of about 5 μm. An aqueous solution of PVA—which was used as a binder—as added to the above in an amount of 1.5 wt. % as reduced to the solid content. These materials were placed in a ball mill and mixed for 24 hours. The resultant slurry in the form of a homogeneous mixture was spray-dried by use of a spray drier so as to obtain granules.

The granules were charged in a metallic press, pre-molded under pressure of 250 kgf/cm², and subsequently molded by use of a cold isostatic press method under pressure of 3,000 kgf/cm², to thereby obtain molded products. The molded products were machined to yield stationary and rotating rings having predetermined sizes shown in Table 1. The thus-machined pieces were placed in a graphite mold and sintered with the application of a pressure of 300 kgf/cm², at a temperature elevation rate of 5° C./minute, and retention for one hour at 2,200° C. under argon. The density of the sintered pieces as determined by the Archimedes method was 2.98 g/cm³. The relative density was 96%. The bending strength was 48 kgf/mm², which was equivalent to that of monolithic sintered pieces. The open pore ratio was as low as 0.1 vol. % and most pores were found to be closed. Also, the sintered pieces were tested for leakage under air pressure of 6 kgf/cm²G, proving absence of air leakage. The sintered pieces were subjected to lapping to obtain a surface roughness of 0.2 μm.

A dry test was performed under the test conditions shown in Table 1. As shown in Table 3, extraordinary wear loss and loud ringing of sliding face occurred. Upon overhaul inspection, scoring was observed in sliding surfaces.

Comparative Example 2-2 (a case which caused unsatisfactory sliding characteristics since the average grain size of graphite was 30 μm and the density of graphite was excessive)

The following materials were weighed: 10 kg of α-type silicon carbide powder (average grain size: 0.4 μm, specific surface area: 20 m²/g), 0.5 wt. % (50 g) of B₄C powder as a sintering aid, 2.0 wt. % (200 g) of carbon black having a specific surface area of 200 m²/g, and 10 wt.90 (with respect to silicon carbide powder ;1,000 g) of commercially available natural graphite; i.e., natural graphite flakes having an average grain size of about 30 μm. An aqueous solution of PVA—which was used as a binder—as added to the above in an amount of 1.5 wt. % as reduced to the solid content. These materials were placed in a ball mill and mixed for 24 hours. The resultant slurry in the form of a homogeneous mixture was spray-dried by use of a spray drier so as to obtain granules. The granules were charged in a metallic press, pre-molded under pressure of 250 kgf/cm², and subsequently molded by use of a cold isostatic press method under pressure of 3,000 kgf/cm², to thereby obtain molded products. The molded products were machined to yield stationary and rotating rings having predetermined sizes shown in Table 1. The thus-machined pieces were placed in a graphite mold and sintered with the application of a pressure of 300 kgf/cm², at a temperature elevation rate of 5° C./minute, and retention for one hour at 2,200° C. under argon. The density of the sintered pieces as determined by the Archimedes method was 2.98 g/cm³. The relative density was about 96%. The bending strength was 48 kgf/mm², which was equivalent to that of monolithic sintered pieces. The open pore ratio was as low as 0.1 vol. % and most pores were found to be closed. Also, the sintered pieces were tested for leakage under air pressure of 6 kgf/cm²G, proving absence of air leakage.

The sintered pieces were subjected to lapping to obtain a surface roughness of 0.2 μm. A dry test was performed under test conditions shown in Table 1. As shown in Table 3, wear loss was high and ringing of sliding face occurred. Upon overhaul inspection, partial scoring was observed in sliding surfaces.

Comparative Example 2-3 (a case which caused unsatisfactory sliding characteristics since the average grain size of graphite was 30 μm and the density of graphite was excessively high (amount of graphite: 20 wt. %))

The following materials were weighed: 10 kg of α-type silicon carbide powder (average grain size: 0.4 μm, specific surface area: 20 m²/g), 0.5 wt. % (50 g) of B$_4$C powder as a sintering aid, 2.0 wt. % (200 g) of carbon black having a specific surface area of 200 m²/g, and 20 wt. % (with respect to silicon carbide powder; 2,000 g) of commercially available natural graphite; i.e., natural graphite flakes having an average grain size of about 30 μm. An aqueous solution of PVA—which was used as a binder—as added to the above in an amount of 1.5 wt. % as reduced to the solid content. These materials were placed in a ball mill and mixed for 24 hours. The resultant slurry in the form of a homogeneous mixture was spray-dried by use of a spray drier so as to obtain granules. The granules were charged in a metallic press, pre-molded under pressure of 250 kgf/cm², and subsequently molded by use of a cold isostatic press method under pressure of 3,000 kgf/cm², to thereby obtain molded products. The molded products were machined to yield stationary and rotating rings having predetermined sizes shown in Table 1. The thus-machined pieces were placed in a graphite mold and sintered with the application of a pressure of 300 kgf/cm2, at a temperature elevation rate of 5° C./minute, and retention for one hour at 2,200° C. under argon. The density of the sintered pieces as determined by the Archimedes method was 2.87 g/cm³. The relative density was 95% and the open pore ratio was 0.4 vol. %.

The sintered pieces were subjected to lapping to obtain a surface roughness of 0.2 μm. A dry test was performed under test conditions shown in Table 1. As shown in Table 3, wear loss was high and loud ringing of sliding face occurred. Upon overhaul inspection, partial scoring was observed in sliding surfaces.

Comparative Example 2-4 (a case which caused unsatisfactory sliding characteristics since the average grain size of graphite was 60 μm and the density of graphite was excessively high (amount of graphite: 20 wt. %))

The following materials were weighed: 10 kg of α-type silicon carbide powder (average grain size: 0.4 μm, specific surface area: 20 m2/g), 0.5 wt. % (50 g) of B$_4$C powder as a sintering aid, 2.0 wt. %- (200 g) of carbon black having a specific surface area of 200 m²/g, and 20 wt. % (with respect to silicon carbide powder; 2,000 g) of commercially available natural graphite; i.e., natural graphite flakes having an average grain size of about 60 W. An aqueous solution of PVA—which was used as a binder—as added to the above in an amount of 1.5 wt. % as reduced to the solid content. These materials were placed in a ball mill and mixed for 24 hours. The resultant slurry in the form of a homogeneous mixture was spray-dried by use of a spray drier so as to obtain granules. The granules were charged in a metallic press, pre-molded under pressure of 250 kgf/cm², and subsequently molded by use of a cold isostatic press method under pressure of 3,000 kgf/cm², to thereby obtain molded products. The molded products were machined to yield stationary and rotating rings having predetermined sizes shown in Table 1. The thus-machined pieces were placed in a graphite mold and sintered with the application of a pressure of 300 kgf/cm2, at a temperature elevation rate of 5° C./minute, and retention for one hour at 2,200° C. under argon. The density of the sintered pieces as determined by the Archimedes method was 2.87 g/cm³. The relative density was 95% and the open pore ratio was 0.4 vol. %.

The sintered pieces were subjected to lapping to obtain a surface roughness of 0.2 μm. A dry test was performed under test conditions shown in Table 1. As shown in Table 3, wear loss was high and loud ringing of sliding face occurred. Upon overhaul inspection, partial scoring was observed in sliding surfaces.

Comparative Example 3 (a case in which poor sliding characteristics were obtained due to an excessively small graphite content although a densely packed structure was obtained)

A case in which the content of graphite is 10 wt. % or less:

The following materials were weighed: 10 kg of α-type silicon carbide powder (average grain size: 0.4 μm, specific surface area: 20 m²/g), 0.5 wt. % (50 g) of B$_4$C powder as a sintering aid, 2.0 wt. % (200 g) of carbon black having a specific surface area of 200 m²/g, and 5 wt. % (with respect to silicon carbide powder; 500 g) of commercially available natural graphite; i.e., natural graphite flakes having an average grain size of about 35 μm. An aqueous solution of PVA—which was used as a binder—as added to the above in an amount of 1.5 wt. % as reduced to the solid content. These materials were placed in a ball mill and mixed for 24 hours. The resultant slurry in the form of a homogeneous mixture was spray-dried by use of a spray drier so as to obtain granules. The granules were charged in a metallic press, pre-molded under pressure of 250 kgf/cm², and subsequently molded by use of a cold isostatic press method under pressure of 1,500 kgf/cm², to thereby obtain molded products.

The molded products were machined to yield stationary and rotating rings having predetermined sizes shown in Table 1. The thus-machined pieces were sintered at a temperature elevation rate of 5° C./minute, and retention for four hours at 2,200° C. under argon. The density of the sintered pieces as determined by the Archimedes method was 2.68 g/cm³. The relative density was about 85% and the open pore ratio was 12 vol. %.

The sintered pieces were placed in a vacuum impregnation apparatus, and after the interior portions of the pieces were sufficiently vacuum-degassified, a phenolic resin was introduced by use of a high pressure impregnation apparatus. Subsequently, the resin was carbonized in a furnace under nitrogen. The resultant graphitized products were tested for leakage under air pressure of 6 kgf/cm²G, proving absence of air leakage.

The sintered pieces were subjected to lapping to obtain a surface roughness of 0.2 μm. A dry test was performed under test conditions shown in Table 1. As shown in Table 3, wear loss was high, and ringing of sliding face and scoring of sliding surfaces occurred.

Comparative Example 4 (a case in which poor mechanical strength was obtained due to an excessively large graphite content although a densely packed structure was obtained)

Content of graphite: 35 wt. %

The following materials were weighed: 10 kg of α-type silicon carbide powder (average grain size: 0.4 μm, specific surface area: 20 m²/g), 0.5 wt. % (50 g) of B$_4$C powder as a sintering aid, 2.0 wt. % (200 g) of carbon black having a specific surface area of 200 m²/g, and 35 wt. % (with respect to silicon carbide powder; 3,500 g) of commercially available natural graphite; i.e., natural graphite flakes having an average grain size of about 45 em. An aqueous solution of PVA—which was used as a binder—as added to the above in an amount of 1.5 wt. % as reduced to the solid content. These materials were placed in a ball mill and mixed for 24 hours. The resultant slurry in the form of a homogeneous mixture was spray-dried by use of a spray drier so as to obtain granules. The granules were charged in a metallic press, pre-molded under pressure of 250 kgf/cm², and subsequently molded by use of a cold isostatic press method under pressure of 1,500 kgf/cm², to thereby obtain molded products.

The molded products were machined to yield stationary and rotating rings having predetermined sizes shown in Table 1. The thus-machined pieces were sintered at a temperature elevation rate of 5° C./minute, and retention for four hours at 2,200° C. under argon. The density of the sintered pieces as determined by the Archimedes method was 2.44 g/cm³. The relative density was about 85% and the open pore ratio was 12 vol. %. In polished surfaces of the resultant pieces, flake-shaped graphite grains having a size ranging from several microns to one hundred and several dozens of microns were found to be uniformly dispersed in the silicon carbide crystals. Since the bending strength of the sintered pieces was as low as 16 kfg/mm², no rubbing test was performed.

Comparative Example 5 (a case in which the grain size of graphite is large and the mechanical strength is low) Grain size of graphite: 120 µm The following materials were weighed: 10 kg of α-type silicon carbide powder (average grain size: 0.4 µm, specific surface area: 20 m²/g), 0.5 wt. % (50 g) of B$_4$C powder as a sintering aid, 2.0 wt. % (200 g) of carbon black having a specific surface area of 200 m²/g, and 20 wt. % (with respect to silicon carbide powder; 2,000 g) of commercially available natural graphite; i.e., natural graphite flakes having an average grain size of about 120 µm. An aqueous solution of PVA—which was used as a binder—as added to the above in an amount of 1.5 wt. % as reduced to the solid content. These materials were placed in a ball mill and mixed for 24 hours. The resultant slurry in the form of a homogeneous mixture was spray-dried by use of a spray drier so as to obtain granules. The granules were charged in a metallic press, pre-molded under pressure of 250 kgf/cm², and subsequently molded by use of a cold isostatic press method under pressure of 2,500 kgf/cm², to thereby obtain molded products.

The molded products were machined to yield stationary and rotating rings having predetermined sizes shown in Table 1. The thus-machined pieces were sintered at a temperature elevation rate of 5° C./minute, and retention for four hours at 2,200° C. under argon. The density of the sintered pieces as determined by the Archimedes method was 2.72 g/cm³. The relative density was about 90% and the open pore ratio was 6 vol. %. In polished surfaces of the resultant pieces, flake-shaped graphite grains having a size ranging from several microns to one hundred and several dozens of microns were found to be uniformly dispersed in the silicon carbide crystals.

The sintered pieces were placed in a vacuum impregnation apparatus, and after the interior portions of the pieces were sufficiently vacuum-degassified, a phenolic resin was introduced by use of a high pressure impregnation apparatus. Subsequently, the resin was carbonized in a furnace under nitrogen. The resultant graphitized products were tested for leakage under air pressure of 6 kgf/cm²G, proving absence of air leakage.

The sintered pieces were subjected to lapping to obtain a surface roughness of 0.2 µm. A dry test was performed under test conditions shown in Table 1. As shown in Table 3, no ringing of sliding face but wear loss was as large as 200 µm/year. Upon overhaul inspection, scoring was observed in sliding surfaces.

Comparative Example 6 (a case in which poor sliding characteristics were obtained although the grain size of graphite was small and a densely packed structure was obtained)

The following materials were weighed: 10 kg of α-type silicon carbide powder (average grain size: 0.4 µm, specific surface area: 20 m²/g), 0.5 wt. % (50 g) of B$_4$C powder as a sintering aid, 2.0 wt. %0 (200 g) of carbon black having a specific surface area of 200 m²/g, and 30 wt. % (with respect to silicon carbide powder; 3,000 g) of commercially available natural graphite; i.e., natural graphite flakes having an average grain size of about 5 µm. An aqueous solution of PVA—which was used as a binder—as added to the above in an amount of 1.5 wt. % as reduced to the solid content. These materials were placed in a ball mill and mixed for 24 hours. The resultant slurry in the form of a homogeneous mixture was spray-dried by use of a spray drier so as to obtain granules. The granules were charged in a metallic press, pre-molded under pressure of 250 kgf/cm², and subsequently molded by use of a cold isostatic press method under pressure of 3,000 kgf/cm², to thereby obtain molded products.

The molded products were machined to yield stationary and rotating rings having predetermined sizes shown in Table 1. The thus-machined pieces were sintered at a temperature elevation rate of 5° C./minute, and retention for four hours at 2,200° C. under argon. The density of the sintered pieces as determined by the Archimedes method was 2.63 g/cm³. The relative density was about 90% and the open pore ratio was 6 vol. %.

The sintered pieces were placed in a vacuum impregnation apparatus, and after the interior portions of the pieces were sufficiently vacuum-degassified, a phenolic resin was introduced by use of a high pressure impregnation apparatus. Subsequently, the resin was carbonized in a furnace under nitrogen. The resultant composite was tested for leakage under air pressure of 6 kgf/cm²G, proving absence of air leakage.

The sintered pieces were subjected to lapping to obtain a surface roughness of 0.2 µm. A dry test was performed under test conditions shown in Table 1. As shown in Table 3, wear loss was large and ringing of sliding face occurred. Upon overhaul inspection, scoring was observed in sliding surfaces.

Another rubbing test performed in the presence of hot water was performed. As is apparent from the rubbing test results shown in Table 4, the drive torque was as large as 35 kgcm, and during overhaul inspection, surface damage and scoring were observed in sliding surfaces.

Comparative Example 7 (a case in which poor strength was obtained due to low density)

The following materials were weighed: 10 kg of α-type silicon carbide powder (average grain size: 0.4 m, specific surface area: 20 m²/g), 0.5 wt. % (50 g) of B$_4$C powder as a sintering aid, 2.0 wt. % (200 g) of carbon black having a specific surface area of 200 m²/g, and 10 wt. % (with respect to silicon carbide powder; 1,000 g) of commercially available natural graphite; i.e., natural graphite flakes having an average grain size of about 30 am. An aqueous solution of PVA—which was used as a binder—as added to the above in an amount of 1.5 wt. % as reduced to the solid content. These materials were placed in a ball mill and mixed for 24 hours. The resultant slurry in the form of a homogeneous mixture was spray-dried by use of a spray drier so as to obtain granules. The granules were charged in a metallic press, pre-molded under pressure of 250 kgf/cm², and subsequently molded by use of a cold isostatic press method under pressure of 1,500 kgf/cm², to thereby obtain molded products.

The molded products were machined to yield stationary and rotating rings having predetermined sizes shown in Table 1. The thus-machined pieces were placed in a graphite mold and sintered at a temperature elevation rate of 5° C./minute, and retention for four hours at 2,200° C. under argon. The density of the sintered pieces as determined by the Archimedes method was 2.34 g/cm³. The relative density was about 75% and the open pore ratio was 16 vol. %. In polished surfaces of the resultant pieces, flake-shaped graphite grains having a size ranging from several microns to one hundred and several dozens of microns were found to be uniformly dispersed in the silicon carbide crystals. Since the bending strength of the sintered pieces was as low as 11 kfg/mm², no rubbing test was performed.
Comparative Example 8 (a case in which artificial spherical graphite was used; chipping of graphite occurred during sliding movement due to insufficient mechanical strength caused by an insufficiently packed structure)

The following materials were weighed: 10 kg of α-type silicon carbide powder (average grain size: 0.4 μm, specific surface area: 20 m²/g), 0.5 wt. % (50 g) of B₄C powder as a sintering aid, 2.0 wt.10 (200 g) of carbon black having a specific surface area of 200 m²/g, and 15 wt. % (with respect to silicon carbide powder; 1,500 g) of commercially available artificial spherical graphite powder having an average grain size of about 45 μm. An aqueous solution of PVA— which was used as a binder—as added to the above in an amount of 1.5 wt. % as reduced to the solid content. These materials were placed in a ball mill and mixed for 24 hours. The resultant slurry in the form of a homogeneous mixture was spray-dried by use of a spray drier so as to obtain granules.

The granules were charged in a metallic press, premolded under pressure of 250 kgf/cm², and subsequently molded by use of a cold isostatic press method under pressure of 3,000 kgf/cm², to thereby obtain molded products.

The molded products were machined to yield stationary and rotating rings having predetermined sizes shown in Table 1. The thus-machined pieces were sintered at a temperature elevation rate of 5° C./minute, and retention for four hour at 2,200° C. under argon. The density of the sintered pieces as determined by the Archimedes method was 2.76 g/cm³. The relative density was about 90% and the open pore ratio was 6 vol. %. In polished surfaces of the resultant pieces, flake- shaped graphite grains having a size ranging from several microns to one hundred and several dozens of microns were found to be uniformly dispersed in the silicon carbide crystals. The sintered pieces were placed in a vacuum impregnation apparatus, and after the interior portions of the pieces were sufficiently vacuum-degassified, a phenolic resin was introduced by use of a high pressure impregnation apparatus. Subsequently, the resin was carbonized in a furnace under nitrogen. The resultant composite was tested for leakage under air pressure of 6 kgf/cm²G, proving absence of air leakage. The sintered composite was subjected to lapping to obtain a surface roughness of 0.2 μm. A dry test was performed under test conditions shown in Table 1. As is apparent from the test results shown in Table 3, ringing of sliding face was suppressed but considerable wear loss occurred. Partial chipping of artificial graphite and accompanying chipping of silicon carbide were observed in the worn-out. The bending strength of the sintered pieces was as low as 13 kgf/mm². In view that breakage was observed to have started from the interface between silicon carbide and graphite, it is considered that these results may be attributable to insufficient strength at the interface of silicon carbide and graphite.

Figure 2A:
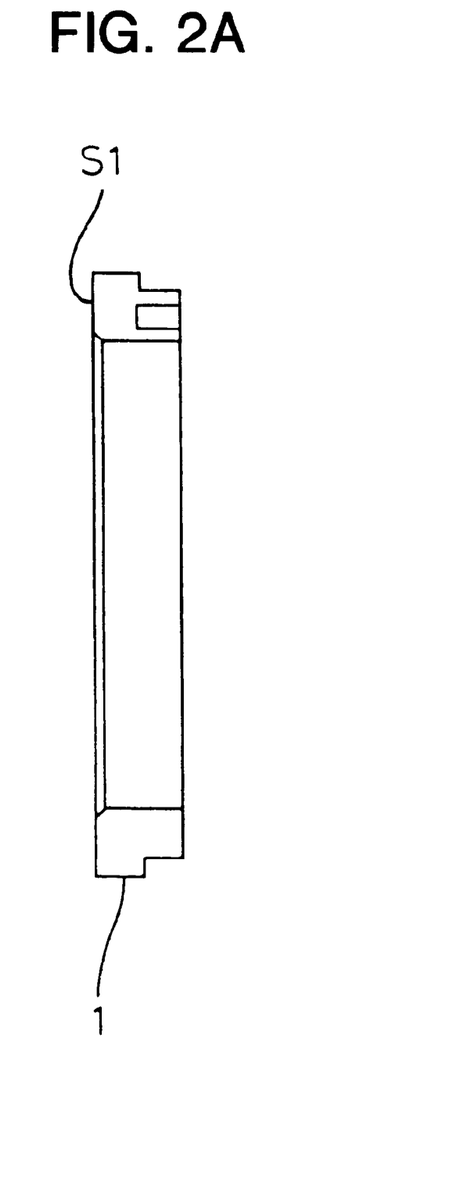
FIG. 2 shows sectional side views of a rotating ring and a stationary ring according to one embodiment of the mechanical seal of the present invention.
Figure 2B:
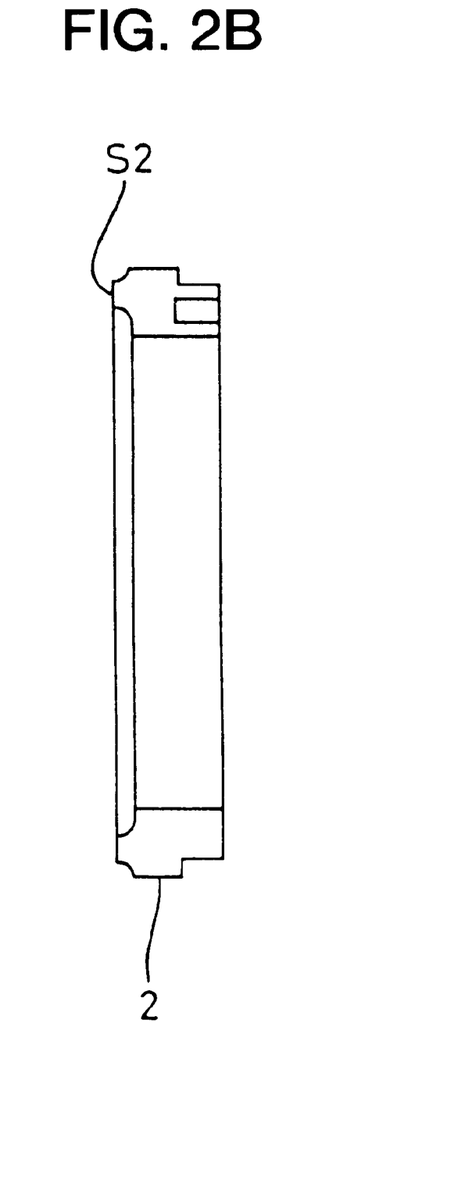
Figure 3:
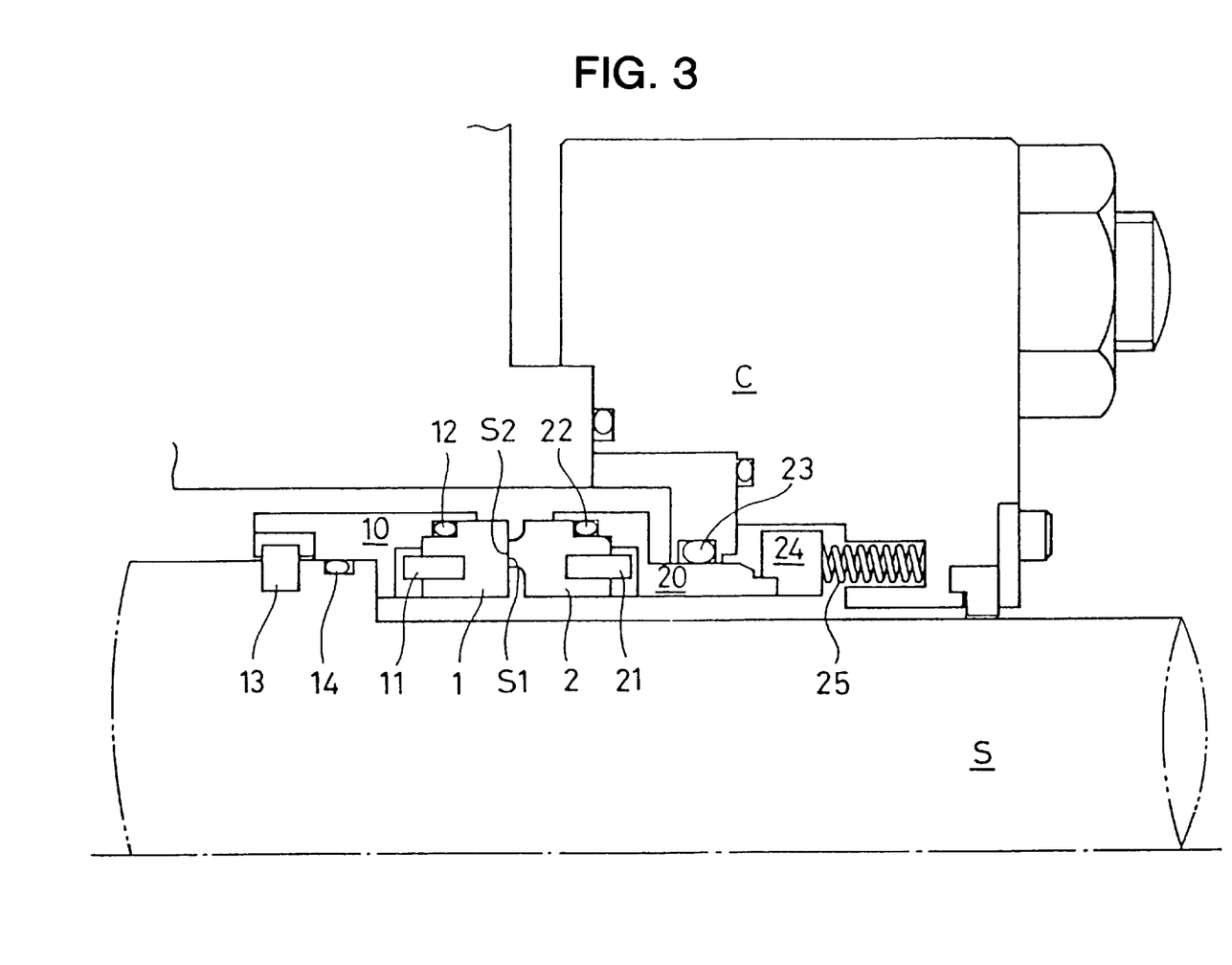
FIG. 3 shows a partial sectional view of an embodiment of the mechanical seal of the present invention.

The products obtained in Examples 1 through 11 of the present invention and Comparative Examples 1, 2-1 through 2-4, and 3 through 8 were machined to form stationary and rotating rings as shown in Table 1 and FIG. 2. The rings were installed in a mechanical seal unit as shown in FIG. 3, and a test was performed under dry conditipns for their mechanical sealing performance. The medium was air, and the pressure source was a compressor. Other test conditions are shown in Table 1.

In addition, the products obtained Examples 1 and 5 of the present invention and Comparative Examples 1 and 6 were machined to form stationary and rotating rings as shown in FIG. 2. In a manner similar to that described above, the rings were installed in a mechanical seal unit as shown in FIG. 3, and a test was performed in hot water to investigate their mechanical sealing performance. The medium was hot water, and the pressure source was a compressor. Other test conditions are shown in Table 2.

The results of these tests are shown in Tables 3 and 4.

As shown in FIG. 3, the aforementioned mechanical seal includes a rotating ring 1 and a stationary ring 2 (both of which are shown in FIG. 2) with a shaft S fit-inserted therethrough. The rotating ring 1 is mounted on the shaft S so that the ring 1 rotates together with the shaft S . The stationary ring 2 is non-rotatably disposed onto the casing C. A seal is formed by bringing the seal surface S1 of the rotating ring 1 and the seal surface S2 of the stationary ring 2 into a sliding contact to each other.

The rotating ring 1 is disposed on a rotary back metal 10 through a pin 10 and an O ring 12, and the rotary back metal 10 in turn is disposed on the shaft S through a pin 13 and an O ring 14.

The stationary ring 2 is disposed on a seal back metal 20 through a pin 21 and an O ring 22, and the seal back metal 20 in turn is disposed on the casing C through an 0 ring 23 so that the seal back metal can move in the axial direction. The seal back metal 20 is urged against the rotating ring 1 by a spring 25 via a compression ring 24. The pressure produced by the spring contributes to the surface pressure between the seal surfaces S1 and S2. The seal back metal 20 is held in the direction of rotation with a pin or a notch (not shown) provided for a compression ring 24, to thereby prevent the stationary ring 2 from rotating together with the shaft.

The rorating ring 1 and a stationary ring 2 may be adapted directly to the casing C and shaft S, respectively, without use of a rotary back metal 10 or a seal back metal 20.

The material of the present may be not necessarily used for both rotating ring 1 and stationary ring 2; i.e., it suffices if either one ring is made of the material of the present invention. Also, the material of the present invention may not necessarily be used for the entirety of the rotating ring 1 or stationary ring 2, if it is used at least for the portions that form seal surfaces S1 and S2, or their proximate areas.

First, the test results of mechanical seal performance under dry circumstances shown in Table 3 will be described.

Comparative Example 1 is drawn to the case in which anomalous sound generally called "ringing of sliding face" occurred in the use of silicon carbide with no graphite added thereto (hereinafter called "no-graphite-added silicon carbide"), and in which considerable surface damage and scoring of the sliding surfaces and a significant amount of wear loss were observed during overhaul inspection. Thus, use of the no-graphite-added silicon carbide is not proven feasible.

Comparative Examples 2-1 to 2-4 are drawn to cases in which considerable ringing of sliding faces occurred and in which considerable surface damage and scoring of the sliding surfaces and a significant amount of wear loss were observed during overhaul inspection, even though test pieces of graphite-added sintered silicon carbide having a density of greater than 92% were used. Though these results are similar to those of Comparative Example 1, the phenomena is not as severe in degree.

Comparative Example 3 is drawn to the case in which considerable ringing of sliding face occurred in the test and in which scoring of the sliding surfaces and a considerable amount of wear loss were observed during overhaul inspection, when a test piece of graphite-added sintered silicon carbide having a proper density but containing a smaller amount of graphite was used. The results are similar to those of Comparative Example 2.

Comparative Example 4 is drawn to the case in which a test piece of graphite-added sintered silicon carbide having a proper density but containing an excess amount of graphite results in low bending strength. The test piece was found unsuitable for use as a rubbing material.

Comparative Example 5 is drawn to the case in which a test piece of graphite-added sintered silicon carbide having a proper density and containing a proper amount of graphite having an extremely large grain size results in low bending strength. This is caused by poor adhesion at the interface between graphite and silicon carbide.

Comparative Example 6 is drawn to the case in which sufficient bending strength was attained but ringing of sliding face occurred in the test piece and surface damage (scoring) of the sliding surfaces and a considerable amount of wear loss were observed during overhaul inspection, when a test piece of graphite-added sintered silicon carbide having a proper density and containing a proper amount of graphite having a small grain size was used.

Comparative Example 7 is drawn to the case in which insufficient bending strength was atained, when a test piece of graphite-added sintered silicon carbide having a low density but containing a proper amount of graphite having a proper grain size was used. The test piece is unsuitable for use as a rubbing material. Comparative Example 8 is drawn to the case in which a test piece of graphite-added sintered silicon carbide having a proper density and containing a proper amount of synthetic graphite—not flake-shaped but almost spherical—having a proper grain size resulted in low bending strength and a considerable amount of wear loss. This is caused by poor adhesion at the interface between graphite and silicon carbide. The test piece is unsuitable for use as a rubbing material.

In contrast, Examples 1, 2, 5, 8, 9, 10, and 11 are drawn to cases in which test pieces had a sufficient strength; substantially no ringing of sliding faces occurred during the tests; and substantially no surface damage or scoring of the sliding surfaces was observed during overhaul inspection. The rubbing test results show a wear loss of 35 $\mu$m/year or less.

Particularly, Example 1 is drawn to the case in which no ringing of sliding faces occurred in the test piece and no surface damage (scoring) of the sliding surfaces was observed during overhaul inspection. The rubbing test results show an extremely low wear loss of 8 $\mu$m/year.

Examples 3, 4, and 6 are drawn to cases in which slight scoring of the sliding surfaces and slight ringing of sliding faces occurred in the test pieces caused by comparatively low graphite content in silicon carbide. These scoring and ringing are not so pronounced as to render the test pieces unusable.

Examples 7 is drawn to the case in which wear loss was more significant and partial chipping was observed due to poor strength of the test piece and in which slight scoring of the sliding surfaces occurred in the test pieces, caused by comparatively low graphite content in silicon carbide. These weak points are not so pronounced as to render the test pieces unusable.

As is apparent from these results, the rubbing materials provided by the present invention, having excellent wear resistance, hardly producing surface damage and scoring of the sliding surfaces, and producing an extremely low level of ringing of sliding faces, are expected to be employed as rubbing materials exhibiting excellent performance under dry conditions.

Furthermore, other experiments prove that the rubbing materials provided by the present invention have remarkably excellent characteristics under dry conditions.

Results of a mechanical seal test performed in hot water at 110° C. are shown in Table 4. When a solution to be sealed has a temperature of higher than 100° C., sliding surfaces of a mechanical seal are exposed to quasi-dry conditions due to evaporation of water, as well as to heat attributed to sliding. Therefore, conventional mechanical seals are susceptible to seizure and scoring of the sliding surfaces which are subsequently damaged through thermal cracking and anomalous wear, thereby decreasing the sealing characteristics.

Comparative Example 1 is drawn to the case in which scoring and concomitant thermal cracking of the sliding surfaces were observed during overhaul inspection due to the high drive torque.

Comparative Example 6 is drawn to the case in which scoring of the sliding surfaces was observed during overhaul inspection even though the drive torque was slightly lower.

In contrast, Example 1 is drawn to the case in which absolutely no scoring or surface damage of the sliding surfaces was observed during overhaul inspection, due to the drive torque being as low as 17 kgcm.

Similar results were obtained in Example 5.

Also, Example 12 is drawn to the case in which leakage of 0.5 cc/h was observed but absolutely no scoring or surface damage of the sliding surfaces was observed, due to the drive torque being as low as 19 kgcm. Examples 13 to 15 are drawn to cases in which slightly increased leakage was observed but absolutely no scoring or surface damage of the sliding surfaces was observed due to the extremely low drive torque as observed in Example 12 . Example 16 is drawn to the case in which a small amount of leakage and slight scoring and surface damage were observed in the sliding surfaces but in which the drive torque was greatly lower than that measured in Comparative Example 6. Since sintered materials in Examples 12 to 16 were not sealed through impregnation-carbonization or impregnation-graphitization, leakage therefrom occurred in an amount corresponding to the pore ratio of the test piece. However, this level of leakage may be acceptable in consideration of actual applications.

As described in the Examples provided hereinabove, the graphite-added sintered silicon carbide and the sintered composite containing the same of the present invention have enough strength to serve as a structural material and have excellent lubrication ability. Therefore, it is very clearly appreciable that these materials exhibit excellent characteristics for use as rubbing materials of a mechanical seal under dry conditions or under other conditions temporally providing dry conditions to sliding surfaces as experienced when hot water is present.

TABLE 1

Mechanical Seal Test Conditions Under Dry Conditions

Mechanical seal ring size mm

|  |  |  |
|---|---|---|
| Stationary ring |  | Outside diameter Ø68 × inside diameter Ø58 × thickness 9 |
| Rotating ring |  | Outside diameter Ø70 × inside diameter Ø57 × thickness 9 |
| Speed of rotation | rpm | 100 |
| Peripheral velocity | m/s | 0.4 |
| Medium |  | Air |
| Pressure of medium | kgf/cm$^2$G | 2 |
| Temperatures of medium | °C. | Room temperature |
| Spring pressure | kgf/cm$^2$ | 0.5 |
| Valance ratio |  | 80 |
| Time of operation | h | 100 |

TABLE 2

Mechanical Seal Test Conditions Under Hot Water Conditions

Mechanical seal ring size mm

|  |  |  |
|---|---|---|
| Stationary ring |  | Outside diameter Ø68 × inside diameter Ø58 × thickness 9 |
| Rotating ring |  | Outside diameter Ø76 × inside diameter Ø57 × thickness 24 |
| Speed of rotation | rpm | 3600 |
| Peripheral velocity | m/s | 13 |
| Medium |  | Hot water |
| Pressure of medium | kgf/cm$^2$G | 2 |
| Temperatures of medium | °C. | 110 |
| Spring pressure | kgf/cm$^2$ | 0.7 |
| Valance ratio |  | 80 |
| Time of operation | h | 8 |

TABLE 3

Mechanical Seal Performance Test Under Dry Conditions

Sintered composite containing sintered silicon carbide with graphite

| No. | Relative density | Graphite content wt % | Average particle size of graphite μm | Open pore ratio vol % | Impregnation and carbonization | Impregnation and graphitization | Bending strength kgf/mm$^2$ | Wear loss μm/year | Surface condition | Ringing of sliding face |
|---|---|---|---|---|---|---|---|---|---|---|
| Ex. 1 | 92 | 20 | 45 | 3 | Yes | Yes | 28 | 8 | Excellent | None |
| Ex. 2 | 92 | 16 | 60 | 3 | Yes | No | 23 | 11 | Excellent | None |
| Ex. 3 | 90 | 15 | 45 | 6 | Yes | No | 30 | 21 | slight scoring | Slight |
| Ex. 4 | 85 | 11.2 | 45 | 11 | Yes | No | 23 | 13 | slight scoring | slight |
| Ex. 5 | 85 | 30 | 45 | 12 | Yes | No | 21 | 9 | Excellent | None |
| Ex. 6 | 90 | 30 | 8 | 6 | Yes | No | 37 | 40 | slight scoring | slight |
| Ex. 7 | 92 | 11.2 | 100 | 3 | Yes | No | 20 | 60 | Slight scoring | None |
| Ex. 8 | 92 | 16 | 20 | 3 | Yes | No | 30 | 26 | Slight scoring | Very slight |
| Ex. 9 | 92 | 16 | 80 | 3 | Yes | No | 21 | 35 | Slight scoring | None |
| Ex. 10 | 92 | 16 | 30 | 3 | Yes | No | 26 | 14 | Excellent | None |
| Ex. 11 | 85 | 16 | 30 | 12 | Yes | No | 23 | 10 | Excellent | None |
| Comp. Ex. 1 | 98 | 0 | — | 0 | No | No | 48 | 1000 | Considerable scoring | Loud |
| Comp. Ex. 2-1 | 96 | 10 | 5 | 0.1 | No | No | 48 | 300 | Considerable scoring | Loud |
| Comp. Ex. 2-2 | 96 | 1.0 | 30 | 0.1 | N0 | No | 48 | 300 | Considerable scoring | Loud |
| Comp. Ex. 2-3 | 95 | 20 | 30 | 0.4 | No | No |  | 230 | Partial scoring | Moderate |
| Comp. Ex. 2-4 | 95 | 20 | 60 | 0.4 | No | No |  | 150 | Partial scoring | Moderate |
| Comp. Ex. 3 | 85 | 5 | 35 | 12 | Yes | No | 25 | 120 | Considerable scoring | Moderate |
| Comp. Ex. 4 | 85 | 35 | 45 | 12 | No | No | 16 | (No rubbing test conducted due to lowered strength) | | |
| Comp. Ex. 5 | 90 | 20 | 120 | 6 | Yes | No | 17 | 200 | Partial scoring | None |
| Comp. Ex. 6 | 90 | 30 | 5 | 6 | Yes | No | 40 | 100 | Partial scoring | Moderate |

TABLE 3-continued

Mechanical Seal Performance Test Under Dry Conditions

Sintered composite containing sintered silicon carbide with graphite

| No. | Relative density | Graphite content wt % | Average particle size of graphite μm | Open pore ratio vol % | Impregnation and carbonization | Impregnation and graphitization | Bending strength kgf/mm² | Rubbing test Wear loss μm/year | Surface condition | Ringing of sliding face |
|---|---|---|---|---|---|---|---|---|---|---|
| Comp. Ex. 7 | 75 | 10 | 30 | 16 | No | No | 11 | (No rubbing test conducted due to lowered strength) | | |
| Comp. Ex. 8 | 90 | 15 | 45 (Spherical graphite) | 6 | Yes | No | 13 | 800 (Rubbing test conducted for confirmation despite lowered strength) | Excellent | None |

TABLE 4

Mechanical Seal Performance Test Under Dry Conditions

Sintered composite containing sintered silicon carbide with graphite

| No. | Relative density | Graphite content wt % | Average particle size of graphite μm | Open pore ratio vol % | Impregnation and carbonization | Impregnation and graphitization | Bending Torque kgcm | Rubbing test Surface condition | Leakage cc/h |
|---|---|---|---|---|---|---|---|---|---|
| Ex. 1 | 92 | 20 | 45 | 3 | Yes | Yes | 17 | Excellent | 0 |
| Ex. 5 | 85 | 30 | 45 | 12 | Yes | No | 20 | Excellent | 0 |
| Ex. 12 | 92 | 16 | 60 | 3 | No | No | 19 | Excellent | 0.5 |
| Ex. 13 | 90 | 16 | 80 | 6 | No | No | 21 | Excellent | 1.0 |
| Ex. 14 | 90 | 30 | 60 | 6 | No | No | 17 | Excellent | 1.2 |
| Ex. 15 | 85 | 16 | 30 | 12 | No | No | 20 | Excellent | 2.8 |
| Ex. 16 | 90 | 11.2 | 20 | 6 | No | No | 23 | Slight scoring | 1.1 |
| Comp. Ex. 1 | 98 | 0 | — | 0 | No | No | 39 | Moderate scoring | 0 |
| Comp. Ex. 6 | 90 | 30 | 5 | 6 | Yes | No | 35 | Moderate scoring | 0 |

What is claimed is:

1. A sintered silicon carbide with graphite added thereto comprising 10–30 wt. % of natural graphite flakes having an average grain size of 8–100 μm and the remainder silicon carbide and a sintering aid, and having a relative density of 80–92%.

2. A sintered silicon carbide with graphite added thereto according to claim 1, wherein the average grain size of the natural graphite flakes is 20–80 μm.

3. A sintered silicon carbide with graphite added thereto according to claim 1, wherein the average grain size of the natural graphite flakes is 30–60 μm.

4. A sintered silicon carbide with graphite added thereto according to claim 1, wherein the natural graphite flakes is contained in an amount of 16–30 wt. %.

5. A sintered silicon carbide with graphite added thereto according to claim 2, wherein the natural graphite flakes is contained in an amount of 16–30 wt. %.

6. A sintered silicon carbide with graphite added thereto according to claim 3, wherein the natural graphite flakes is contained in an amount of 16–30 wt. %.

7. A sintered composite containing graphite-added sintered silicon carbide, which comprises a graphite-added sintered silicon carbide containing 10–30 wt. % of natural graphite flakes having an average grain size of 8–100 μm and the remainder silicon carbide and a sintering aid, and having a relative density of 80–92%; and at least one carbonized or graphitized thermosetting resin contained in open pores of the graphite-added sintered silicon carbide.

8. A sintered composite containing graphite-added sintered silicon carbide according to claim 7, wherein the average grain size of the natural graphite flakes is 20–80 μm.

9. A sintered composite containing graphite-added sintered silicon carbide according to claim 7, wherein the average grain size of the natural graphite flakes is 30–60 μm.

10. A sintered composite containing graphite-added sintered silicon carbide according to claim 7, wherein the natural graphite flakes is contained in an amount of 16–30 wt. %.

11. A sintered composite containing graphite-added sintered silicon carbide according to claim 8, wherein the natural graphite flakes is contained in an amount of 16–30 wt. %.

12. A sintered composite containing graphite-added sintered silicon carbide according to claim 9, wherein the natural graphite flakes is contained in an amount of 16–30 wt. %.

13. A mechanical seal which includes a rotating ring and a stationary ring, the rotating ring being adapted onto a rotary shaft and being permitted to rotate together with the rotary shaft, and the stationary ring being adapted onto a casing, end surfaces of the rotating ring and the stationary ring being brought to slidable contact so as to establish seal surfaces to form a seal therebetween; wherein the seal surface of at least one of the rotating ring and the stationary ring and the proximity of the seal surfaces are formed of a graphite-added sintered silicon carbide comprising 10–30 wt. % of natural graphite flakes having an average grain size of 8–100 µm and the remainder silicon carbide and a sintering aid, and having a relative density of 80–92%.

14. A mechanical seal which includes a rotating ring and a stationary ring, the rotating ring being adapted onto a rotary shaft and being permitted to rotate together with the rotary shaft, and the stationary ring being adapted onto a casing, end surfaces of the rotating ring and the stationary ring being brought to slidable contact so as to establish seal surfaces to form a seal therebetween; wherein the seal surface of at least one of the rotating ring and the stationary ring and the proximity of the seal surfaces are formed of a sintered composite containing graphite-added sintered silicon carbide comprising a graphite-added sintered silicon carbide containing 10–30 wt. % of natural graphite flakes having an average grain size of 8–100 µm and the remainder silicon carbide and a sintering aid, and having a relative density of 80–92%, and at least one carbonized or graphitized thermosetting resin contained in open pores of the graphite-added sintered silicon carbide.

15. A mechanical seal according to claim 14, wherein the average grain size of the natural graphite flakes of the sintered composite containing graphite-added sintered silicon carbide is 20–80 µm.

16. A mechanical seal according to claim 14, wherein the average grain size of the natural graphite flakes of the sintered composite containing graphite-added sintered silicon carbide is 30–60 µm.

17. A mechanical seal according to claim 14, wherein the amount of the natural graphite flakes contained in the sintered composite containing graphite-added sintered silicon carbide is 16–30 wt. %.

18. A mechanical seal according to claim 15, wherein the amount of the natural graphite flakes contained in the sintered composite containing graphite-added sintered silicon carbide is 16–30 wt. %.

19. A mechanical seal according to claim 16, wherein the amount of the natural graphite flakes contained in the sintered composite containing graphite-added sintered silicon carbide is 16–30 wt. %.

* * * * *